Figure 1:
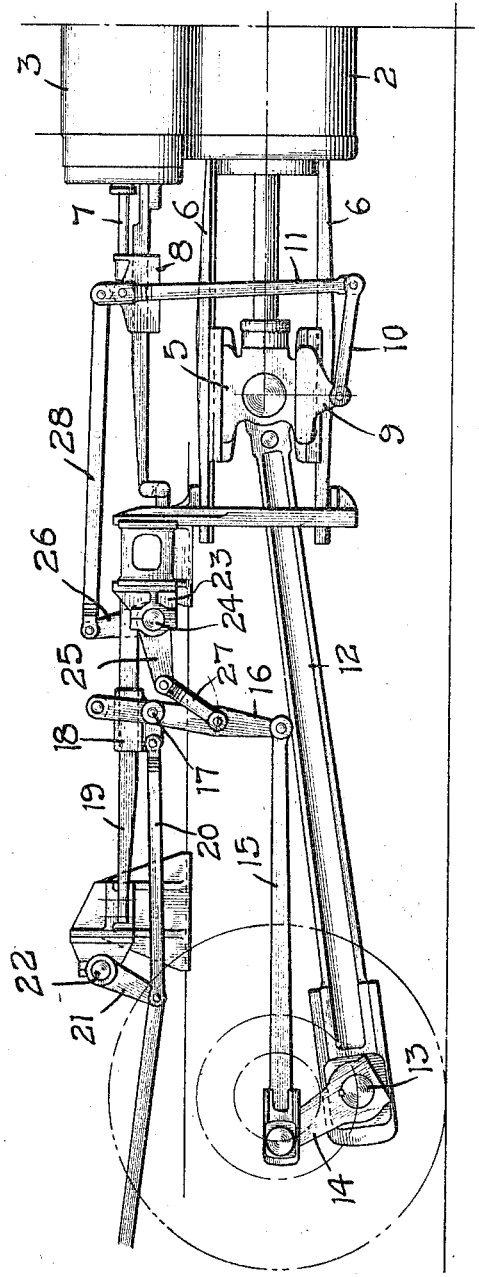

W. E. JOHNSTON.
VALVE GEAR.
APPLICATION FILED NOV. 18, 1909.

1,032,367.

Patented July 9, 1912.
3 SHEETS—SHEET 1.

WITNESSES

INVENTOR
WAYBURN E. JOHNSTON
BY
ATTORNEYS

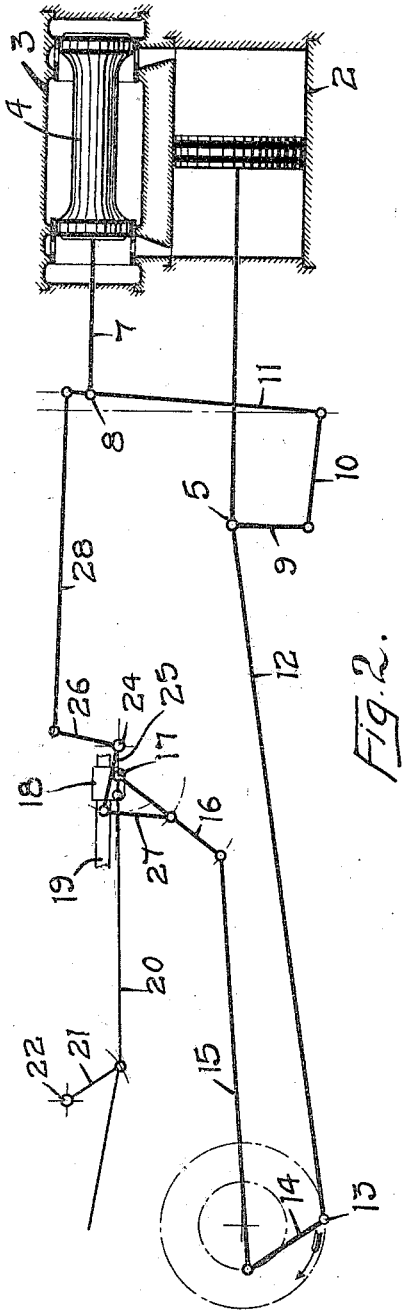
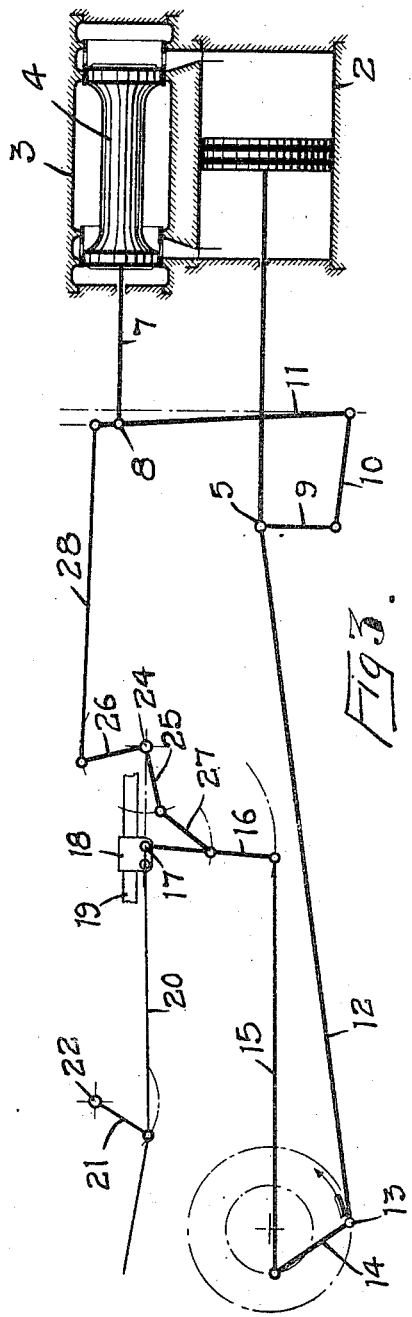

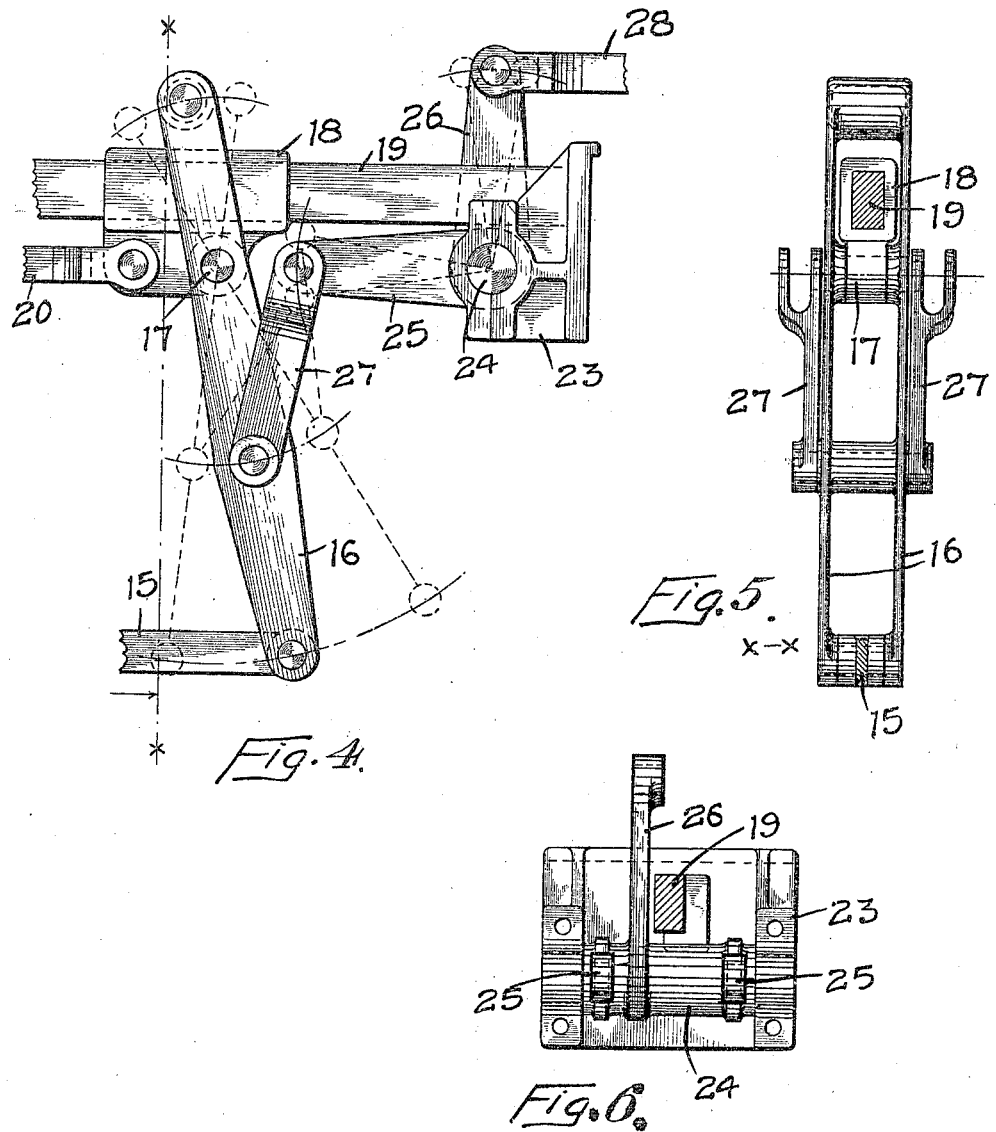

UNITED STATES PATENT OFFICE.

WAYBURN E. JOHNSTON, OF ST. PAUL, MINNESOTA.

VALVE-GEAR.

1,032,367.

Specification of Letters Patent.

Patented July 9, 1912.

Application filed November 18, 1909. Serial No. 528,319.

*To all whom it may concern:*

Be it known that I, WAYBURN E. JOHNSTON, of St. Paul, Ramsey county, Minnesota, have invented certain new and useful Improvements in Valve-Gears, of which the following is a specification.

My invention relates to valve gears for engines, particularly locomotives, and the object of the invention is to dispense with the usual link and block mechanism and obtain an increased accuracy of motion in service.

A further object is to reduce the cost of application of the device to an engine and the cost of maintenance, the wearing parts being easily replaced by the use of simple shop facilities.

A still further object is to provide a mechanism in which the accuracy of motion is not affected by the vertical or lateral motion of the main wheels on a rough track, and to provide a mechanism in which the centers of the steam chests may be nearer the center of the engine in engines of certain types.

Other objects of the invention will appear from the following detailed description.

The invention consists generally in various constructions and combinations, all as hereinafter described and particularly pointed out in the claims.

In the accompanying drawings forming part of this specification, Figure 1 is a side elevation of a portion of a locomotive, illustrating the application of my invention thereto. Fig. 2 is a diagrammatic view illustrating the gear set for forward motion, Fig. 3 is a similar view illustrating the gear set for reverse, Fig. 4 is a detail view illustrating that portion of the mechanism which forms the subject matter of my invention, Fig. 5 is a vertical, sectional view looking toward the right on the line $x$—$x$ of Fig. 4, Fig. 6 is a detail, sectional view illustrating the construction and arrangement of the rocker.

In the drawing, 2 represents the engine cylinder, 3 the steam chest and 4 a piston valve of the inside admission type.

5 represents a cross head, 6 guides therefor, 7 the valve rod and 8 the valve rod cross head.

9 is a cross head arm and 10 a union link connecting it with a combination lever 11, which is pivoted on the valve rod cross head.

The main rod 12 connects the cross head 5 with a main crank pin 13.

14 is an eccentric crank and 15 an eccentric rod connecting said crank with an oscillating lever 16. This lever is pivoted at 17 on a slide 18 which forms the oscillating lever fulcrum, and is movable horizontally back and forth on a guide 19. A reach rod 20 connects the slide 18 with an arm 21 on a reversing shaft 22 which extends across the engine for the control of the gear on the opposite side. A further extension of said rod 20ª leads from said shaft to the reversing lever in the cab, (not shown.) Through this reach rod 20ª the engineer may rock the shaft 22 in the usual way.

23 is a rocker box having bearings for a rocker 24 that is provided with arms 25 and 26. Links 27 connect the end of the arm 25 with the middle portion of the oscillating lever 16 and a transmission bar 28 connects the arm 26 with the upper end of the combination lever 11 above its pivotal connection with the crosshead 8 for inside admission valves or below said pivotal connection for outside admission valves.

The movement of the parts to obtain a forward or reverse movement of the valve in back motion is illustrated in Fig. 4. If the oscillating lever and the links 27 are set so that the pivotal connection of said links with the arm 25 and the pivot 17 are concentric, no motion will be transmitted to the transmission bar 28, the rocker arm 26 being then stationary. If the reversing lever is thrown forward and the slide moved to the position indicated in Fig. 2, the valve will assume the position shown in said figure, taking steam in the front of the piston, and opening the cylinder in rear of the piston to the exhaust. In Fig. 3 the reverse position is shown with the cylinder taking steam in rear of the piston.

I have shown the combination lever 11 on the outer side of the crosshead and guides therefor, but it may be arranged on the inner side in certain types of engines, should this construction be desirable. The transmission bar 28 may be made of any length to suit, and the rocker 24 and oscillating lever 16 may therefore be located to make the eccentric rod 15 as long as may be desired.

The connection between the eccentric rod 15 and oscillating lever 16 in its central position may be made level with the center of the main axle. The center line of motion of the eccentric rod 15 is therefore practically horizontal and is perpendicular to the vertical motion of the main axle. This I consider an important feature of my invention, as this construction prevents inaccuracies in the valve motion due to vertical motion of the main wheel in passing over rough track.

It will be noted that the valve gear mechanism is all arranged on the outside of the engine, where it is open for inspection and easily reached at any time.

I have shown the gear as arranged for an inside admission valve of the piston type, but the gear is equally well suited for an outside admission valve of either the slide or piston types. For outside admission valves, the transmission bar 28 will be connected to the combination lever 11 below the valve rod crosshead connection, and the eccentric crank 14 will be turned on the crank pin 13 so as to give the eccentric rod 15 a motion the reverse of that which it would receive from the arrangement as shown on the drawings herewith.

I have shown the valve stem 7 connected to a crosshead 8, which slides on a horizontal guide, but this arrangement may be modified as required, provided that the operative relations between the transmission bar 28, combination lever 11 and the valve stem 7 are not altered.

I have shown two backwardly extending arms 25 on the rocker 24, but one such arm may be used working inside of the oscillating lever. The lever 16 in this case would have trunnions at 17 on its outer sides and a double guide 19 having a bar on each side of the oscillating lever.

I claim as my invention:

1. A valve gear comprising a slide, a horizontal guide therefor, a reach rod pivotally connected with said slide, a lever pivoted at one end on said slide, an eccentric rod pivotally connected with the other end of said lever, a rocker having arms 25 and 26 thereon, links pivotally connecting said arms 25 with the middle portion of said lever, said links being one-half the length substantially of said lever, a valve, a cylinder cross head, and mechanism connecting the said arm 26 with said valve and cross head.

2. A valve gear comprising a slide, a guide therefor and an operating means connected therewith, an oscillating lever pivoted at one end on said slide, an eccentric rod pivotally connected with the other end of said lever, a rocker having an arm thereon, a link pivotally connecting said arm with said oscillating lever, the connection of the parts balancing the strain, the movement of the pivotal connection of the oscillating lever with the slide correcting for the angularity of the eccentric rod, a valve, a cylinder cross head, and mechanism operatively connecting said rocker with said valve and cross head.

3. A valve gear comprising a slide, a guide therefor, and an operating means connected with said slide, an oscillating lever having one end pivotally connected with said slide, an eccentric rod pivotally connected with the other end of said oscillating lever, a rocker having an arm thereon, links pivotally connecting said arm with said oscillating lever at a point intermediate to the ends thereof, the pivotal connection of said links with said arm and the pivot of said lever on said slide being concentric substantially when said slide is in its neutral position, the arrangement of said lever, links, and eccentric rod balancing the strain and eliminating lateral pressure on the pivots, a valve, a cylinder cross head, and mechanism operatively connecting said rocker with said valve and cross head.

4. A valve gear comprising a slide, a guide therefor, a reversing shaft having an arm thereon and means for rocking said arm, a reach rod connecting said slide with arm, a lever pivoted at one end on said slide, an eccentric rod pivotally connected with the other end of said lever, a rocker having arms thereon, links pivotally connecting one of said arms with said lever, a valve, a cylinder cross head, and mechanism connecting another of said rocker arms with said valve and cross head.

In witness whereof, I have hereunto set my hand this 13th day of November 1909.

WAYBURN E. JOHNSTON.

Witnesses:
J. FRANK HORN,
W. T. FRANCIS.

Copies of this patent may be obtained for five cents each, by addressing the "Commissioner of Patents, Washington, D. C."